United States Patent
Isaac et al.

(10) Patent No.: US 6,748,211 B1
(45) Date of Patent: Jun. 8, 2004

(54) DEVICE AND METHOD FOR TRANSMITTING A MESSAGE FROM A CLIENT DEVICE TO A SERVICE CENTER

(75) Inventors: Emad S. Isaac, Woodridge, IL (US); Husain S. Das, Schaumburg, IL (US)

(73) Assignee: Motorola, Inc., Schaumburg, IL (US)

( * ) Notice: Subject to any disclaimer, the term of this patent is extended or adjusted under 35 U.S.C. 154(b) by 89 days.

(21) Appl. No.: 10/153,104

(22) Filed: May 22, 2002

(51) Int. Cl.[7] .............................................. H04Q 7/20
(52) U.S. Cl. .................................. 455/414.1; 455/412.2
(58) Field of Search .............................. 455/404.1, 410, 455/412.2, 414.1, 404.2, 435.2, 435.3, 521, 445, 466, 527, 552.1, 553.1; 709/207; 370/412, 468, 310, 310.1, 310.2, 328

(56) References Cited

U.S. PATENT DOCUMENTS

| | | | |
|---|---|---|---|
| 4,350,970 A | | 9/1982 | Von Tomkewitsch |
| 4,812,843 A | | 3/1989 | Champion, III et al. |
| 4,872,159 A | * | 10/1989 | Hemmady et al. .......... 370/352 |
| 5,031,104 A | | 7/1991 | Ikeda et al. |
| 5,182,555 A | | 1/1993 | Sumner |
| 5,444,761 A | | 8/1995 | Nagashima |
| 5,523,950 A | | 6/1996 | Peterson |
| 5,774,827 A | | 6/1998 | Smith, Jr. et al. |
| 5,845,227 A | | 12/1998 | Peterson |
| 5,930,684 A | * | 7/1999 | Keskitalo et al. ............. 455/69 |
| 5,960,035 A | * | 9/1999 | Sridhar et al. ............... 375/219 |
| 5,983,094 A | | 11/1999 | Altschul et al. |
| 6,026,375 A | | 2/2000 | Hall et al. |
| 6,119,014 A | * | 9/2000 | Alperovich et al. ........ 455/466 |
| 6,159,260 A | * | 12/2000 | Hammes ...................... 55/502 |
| 6,360,103 B2 | * | 3/2002 | Veerasamy .................. 455/512 |
| 6,374,099 B1 | * | 4/2002 | Bi et al. .................. 455/404.1 |
| 6,389,287 B1 | * | 5/2002 | Smith et al. ................. 455/445 |
| 6,400,695 B1 | * | 6/2002 | Chuah et al. ............... 370/310 |
| 6,442,159 B2 | * | 8/2002 | Josse et al. .................. 370/354 |

FOREIGN PATENT DOCUMENTS

WO     WO 98/47295 A1     10/1998

OTHER PUBLICATIONS

Zhao, Y. "Telematics: Safe and Fun Driving". IEEE Intelligent Systems, 2002, pp 10–14.

* cited by examiner

Primary Examiner—Jean Gelin
(74) Attorney, Agent, or Firm—Thomas V. Miller; Brian M. Mancini

(57) ABSTRACT

A client device in a communication system having a service center. The client device includes a microcomputer and a wireless communication device. The microcomputer may generate a message and determine whether the message includes high-priority data. The wireless communication device has the capability of transmitting the message to the service center over each of a plurality of bearer services. The microcomputer then sequentially selects to transmit the message over each of the plurality of bearer services according to a first sequential order until the message is transmitted to the service center if the message includes high-priority data. Alternatively, the microcomputer sequentially selects to transmit the message over each of the plurality of bearer services according to a second sequential order until the message is transmitted to the service center if the message does not include high-priority data. There are also methods of performing these functions in the client device.

24 Claims, 6 Drawing Sheets

DEVICE AND METHOD FOR TRANSMITTING A MESSAGE FROM A CLIENT DEVICE TO A SERVICE CENTER

FIELD OF THE INVENTION

This invention in general relates to a device and method for transmitting a message from a client device to a service center and, more particularly, to a device and method that sequentially attempts to transmit the message over each of a plurality of bearer services in a sequential order that depends on the priority of data contained within the message.

BACKGROUND OF THE INVENTION

There is an ever-increasing demand for wireless communication and convenience. Wireless subscribers desire to have access to information at any time and any place. Wireless subscribers also desire to be able to control other mechanical and electronic devices through one wireless device in an efficient and cost-effective manner. One of the fastest growing markets for providing wireless services is known as "Telematics" and entails delivering a wide spectrum of information and services via wireless links to vehicle-based subscribers.

The type of information and services anticipated for Telematics include emergency services such as collision notification and roadside assistance. Telematics may also include other services such as navigation, route guidance, remote-door unlocking, traffic information, weather information, and points of interest.

Current, over the air protocols may have multiple bearer services to transmit data from a subscriber to a Telematics service center. In conventional Telematics systems, the bearer service is defined and selected prior to transmittal of the message and are indifferent to the type of data contained in the message. Moreover, once defined and selected, the application is locked to a particular bearer service. For example, the subscriber may attempt to transmit the data message a fixed number of times until it gets an acknowledgement that the data message was received by the service center. The problem with this approach is that if the subscriber transmitting the message does not get an acknowledgement after the fixed number of times, the system may stop further attempts leaving the message unsent.

Accordingly, there is a need to provide an improved device and method for transmitting data messages in a Telematics system. It is, therefore, desirable to provide an improved device and method to overcome or minimize most, if not all, of the preceding problems.

Figure 1:
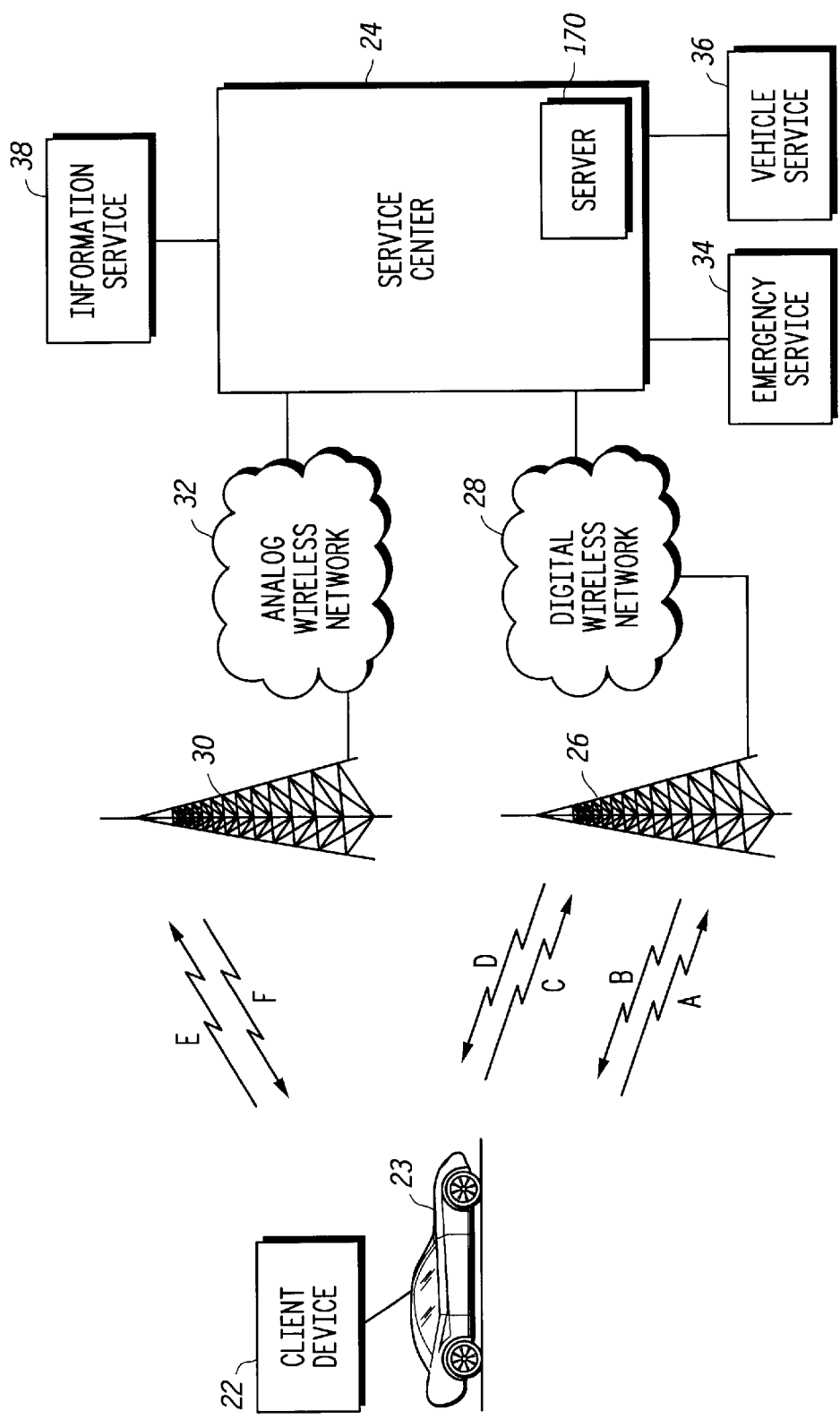
FIG. 1 is a top-level block diagram of one embodiment of a system of the present invention having a client device and a service center.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the appended claims.

DETAILED DESCRIPTION

What is described is device and method for transmitting a message from a client device to a service center. The device and method improves the chances for successfully transmitting a data message and is sensitive to the type of data in the message. In the following detailed description of exemplary embodiments of the invention, reference is made to the accompanying drawings, which illustrate specific exemplary embodiments in which the invention may be practiced. These embodiments are described in sufficient detail to enable those skilled in the art to practice the invention, but other embodiments may be utilized and logical, mechanical, electrical and other changes may be made without departing from the scope of the present invention. The following detailed description is, therefore, not to be taken in a limiting sense, and the scope of the present invention is defined only by the appended claims.

For clarity of explanation, the illustrated embodiments of the present invention are presented, in part, as comprising individual functional blocks. The functions represented by these blocks may be provided through the use of either shared or dedicated hardware, including, but not limited to, hardware capable of executing software. The present invention is not limited to implementation by any particular set of elements, and the description herein is merely representational of suitable embodiments.

To this end, in one embodiment there is a client device in a communication system having a service center. The client device includes a microcomputer and a wireless communication device. The microcomputer may generate a message and determine whether the message includes high-priority data. The wireless communication device has the capability of transmitting the message to the service center over each of a plurality of bearer services. The microcomputer sequentially selects to transmit the message over each of the plurality of bearer services according to a first sequential order until the message is transmitted to the service center if the message includes high-priority data. Alternatively, the microcomputer sequentially selects to transmit the message over each of the plurality of bearer services according to a second sequential order until the message is transmitted to the service center if the message does not include high-priority data.

In one embodiment, the first sequential order of bearer services for high-priority data may be based according to a transmission rate of each bearer service. For data that is not high-priority, the second sequential order of bearer services may be based according to a transmission cost of each bearer service. The first sequential order of bearer services and the second sequential order of bearer services may be configurable within the microcomputer. The determination in the microcomputer of whether the message includes high-priority data may further include a consideration of whether the data relates to an emergency call. Several types of bearer services may be used for the present invention, as will be described in more detail below.

Another embodiment includes a method for transmitting data from a client device to a service center. The method includes the steps of: determining whether the data is high-priority; if the data is high-priority, then sequentially selecting to transmit the data over each of a plurality of bearer services according to a first sequential order of bearer services until the data is transmitted to the service center; and if the data is not high-priority, then sequentially selecting to transmit the data over each of the plurality of bearer services according to a second sequential order of bearer services until the data is transmitted to the service center.

A further embodiment includes a method for transmitting a message from a client device to a service center. The method includes the steps of: determining whether the message includes high-priority data; attempting to transmit the message over each of a plurality of bearer services by sequentially selecting each bearer service according to a first sequential order of bearer services if the message includes high-priority data; and attempting to transmit the message over each of the plurality of bearer services by sequentially selecting each bearer service according to a second sequential order of bearer services if the message does not include high-priority data.

Yet another embodiment includes a method for transmitting a message from a client device to a service center that includes the steps of: determining whether the message includes high-priority data; attempting to transmit the message over a first bearer service to the service center, the first bearer service selected from a first priority list if the message includes high-priority data, the first bearer service selected from a second priority list if the message does not include high-priority data; determining whether the message was successfully transmitted to the service center over the first bearer service; attempting to transmit the message over a second bearer service to the service center, the second bearer service selected from the first priority list if the message includes high-priority data, the second bearer service selected from the second priority list if the message does not include high-priority data; and determining whether the message was successfully transmitted to the service center over the second bearer service.

Communication System 20

Now, turning to the drawings, FIG. 1 illustrates a top-level block diagram of a communication system 20 for the present invention. Generally, the communication system 20 includes a client device 22 and a service center 24. In one embodiment, the client device 22 is incorporated into a vehicle 23. Although only one client device 22, vehicle 23, and service center 24 are shown, the invention can include any number of these elements interoperating with each other. The components and functions of the client device 22 and service center 24 are described further below in relation to FIGS. 2–6.

Referring initially to FIG. 1, in the communication system 20, the client device 22 and the service center 24 may transmit data messages over wireless communications. The wireless communications are illustrated in FIG. 1 by communication arrows A–F. The wireless communications A–F may be divided into individual sets (A–B, C–D, E–F) for each type of bearer service of the over the air protocols. Different types of bearer services exist for transmitting data over wireless communications including, but not limited to, general packet radio service (GPRS), short message service (SMS), circuit switched data service (CSD), and high-speed circuit switched data service (HSCSD).

In particular, GPRS is a bearer service that allows the transmission of high-speed data over existing digital communication networks such as the Global System for Mobile Communications (GSM) protocol. GPRS supports the Internet Protocol (IP). This allows the client device 22 to have access to Internet information and applications. GPRS is a type of virtual connection that allows the user to always be connected to a network. The transmission rate of GPRS is over about 64 kbits/sec. Currently, however, the transmission cost of GPRS is typically based on the amount of data that is transmitted and may be more costly compared to other bearer services.

SMS is a bearer service that allows the transmission of data over several types of existing protocols such as GSM, Code Division Multiple Access (CDMA), and Time Division Multiple Access (TDMA). SMS enables a client device 22 to transmit short data messages to the service center 24. The time to transfer data in SMS is not as good as transferring data in GPRS. Yet, the transmission cost of transmitting data using SMS is cheaper than GPRS.

CSD is a bearer service that allows the transmission of data over several types of existing protocols such as GSM, CDMA, TDMA, and Advanced Mobile Phone System (AMPS). When transmitting over an analog communication network (such as AMPS), the client device 22 will need a data modem for the wireless transceiver. The transmission rate of CSD is about 9.6 kbits/sec. Currently, the transmission cost of transmitting data using CSD is cheaper than GPRS.

HSCSD is an enhancement of CSD to allow the transmission of data over existing protocols such as GSM. One enhancement includes a new coding scheme with less error protection capabilities. This allows the transmission rate to be increased from about 9.6 kbits/sec to 14.4 kbits/sec. Another enhancement includes providing up to four time slots for a single data call. This allows transmission rates from 38.4 kbits/sec to 57.6 kbits/sec (depending on whether the bearer is at 9.6 kbits/sec or 14.4 kbits/sec). Currently, however, the transmission cost of transmitting data via HSCSD is more expensive compared to other bearer services such as SMS or CSD.

The above described bearer services are merely representative of existing bearer services that could be used in the present invention. In other embodiments, other bearer services could be used depending on the implementation and geographic location such as those anticipated for digital protocols of W-CDMA/UMTS (Wideband Code Multiple Access/Universal Mobile Telecommunications System) and cdma2000. The communications between the client device 22 and the service center 24 will now be described generally although a more detailed description is provided after the general discussion.

Generally, in one embodiment, a client device 22 transmits a message (containing data) to the service center 24 via communication A, C, or E over one of a plurality of bearer services. The selection of the bearer service will be explained in more detail below but will generally depend on the type of data contained in the message. For example, in one embodiment, the data in the message may be designated as high-priority data if the data relates to an emergency call. In another embodiment, the data may be designated as high-priority data by the user. If the data is high-priority, the client device 22 will then sequentially select to transmit the message over each of the plurality of bearer services according to a sequential order of bearer services until the message is transmitted to the service center 24. In one embodiment, the sequential order of bearer services may be based according to a transmission rate of each bearer service. For instance, certain bearer services could be listed in a sequential order from the highest transmission rate to the lowest transmission rate as follows: (1) GPRS; (2) SMS; and (3) CSD.

Other data may not be designated as high-priority if the data simply relates to information services (such as a request for navigation or traffic information). If the data is not high-priority, the client device 22 will then sequentially select to transmit the message over each of the plurality of bearer services according to a different sequential order of bearer services until the message is transmitted to the service center 24. In one embodiment, this sequential order of bearer services may be based according to the transmission cost of each bearer service. For instance, certain bearer services could be listed in a sequential order from cheaper transmission costs to more expensive transmission costs as follows: (1) SMS; (2) CSD; and (3) GPRS.

The client device 22, in a number of ways, may initiate the transmission of a data message. For example, a software application monitoring certain vehicle sensors (such as an airbag deployment sensor) may automatically initiate a data message to the service center 24 upon the occurrence of an event (such as the deployment of the airbag). Additionally, the message may be in response to user demand (such as pushing a button within the vehicle or reciting a voice command to a voice recognition system). The data message may include items such as the priority identification, the type of call, the specific requested service, and other information to help the service center 24 to process the requested service.

Those of ordinary skill in the art, having the benefit of this disclosure, will appreciate that many possible bearer services and wireless communication methods may be used for transmitting a data message from a client device 22 to the service center 24. In one embodiment, the communications are transmitted through an over the air protocol such as AMPS, CDMA, GSM or TDMA by one of the bearer services described above. The transmission from the client device 22 to the service center 24 may also be made by other wireless communications such as satellite communications. In satellite communications, a message containing data is transmitted to an earth orbiting satellite, through a satellite base station and wireless gateway, and to the service center 24.

As shown in FIG. 1, in one embodiment, the data message is sent via communication A, C, or E though a bearer service over either a base station antenna 26 for a digital wireless network 28 or a base station 30 for an analog wireless network 32 (depending on the selected bearer service). The message is then transferred to the service center 24 according to known systems such other cellular infrastructure, the Internet, and/or a public switched telephone network (PSTN).

As shown in FIG. 1, in one embodiment, the service center 24 may respond to the message by sending a response or acknowledgement message via communications B, D, or F to the client device 22. This informs the client device 22 that the message was received by the service center 24. Depending on the type of message being sent, the service center 24 may further establish a voice communication link with the vehicle 23 to reassure the user that the message was received or to provide other information related to the requested service.

Messages from the service center 24 to the client device 22 may be sent over a cellular wireless communication through the digital wireless network 28 and associated base station antenna 26 or through the analog wireless network 32 and associated base station antenna 30. Again, those of ordinary skill in the art, having the benefit of this disclosure, will appreciate that many possible protocols may be used for communications from the service center 24 to the client device 22. In one embodiment, the communication is transmitted through an over the air protocol such as CDMA, GSM, TDMA, or AMPS. The transmission from the service center 24 to the client device 22 may also be made by other wireless communications such as satellite communications.

In response to receiving the data message from the client device 22, the service center 24 may further act in a number of ways depending on the type of data contained in the message. For example, if the data contained in the message indicates that the user has an emergency (such as an airbag deployment), the service center 24 may contact an emergency service 34 with the location of the vehicle 23. The emergency service 34 may then send the police, fire brigade, or medical support as needed to the location. If the data contained in the message indicates that the user is in need of vehicle service (such as a flat tire), the service center 24 may contact a vehicle service 36 with the location of the vehicle 23. The vehicle service 36 may then send a tow truck or automobile mechanic as needed to the location. If the data contained in the message indicates that the user is simply in need of information (such as navigation, route-guidance, or traffic services), the service center 24 may contact an information service 38 to obtain information related to the request. The service center 24 could then use the obtained information to process the requested service.

Generally, the client device 22 consists of a wireless communication module and antenna for transmitting and receiving wireless voice and data communications to and from the service center 24. The client device 22 also includes a microcomputer for performing the main functions of transmitting and receiving voice and data communications to and from the service center 24. The client device 22 may also include a GPS module to report the current position of the vehicle 23.

Client Device 22

Figure 2:
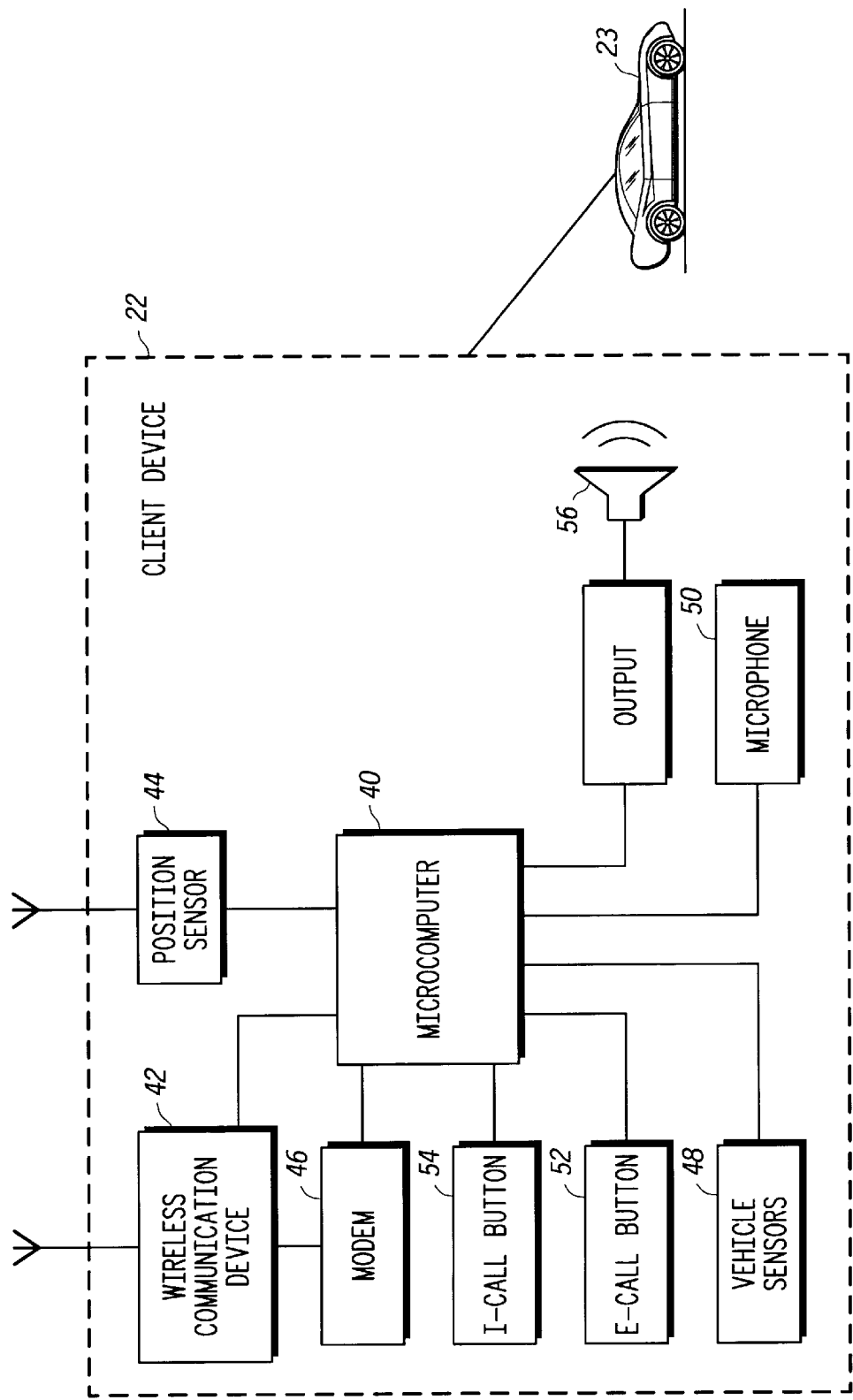
FIG. 2 is a block diagram of one embodiment of a client device for the system in FIG. 1.

The client device 22 will now be described in more detail in reference to FIGS. 2–5. Referring to FIG. 2, in one embodiment, a client device 22 is an in-vehicle unit having a microcomputer 40 and a wireless communication device 42. Depending on the particular implementation, the microcomputer 40 and wireless communication device 42 may be an integral part of the vehicle 23. Alternatively, the microcomputer 40 and wireless communication device 42 may be separate components included in a device such as a portable Telematics device, cellular or Personal Communication System (PCS), a pager, or a hand-held computing device such as a personal digital assistant (PDA) that is docketed or otherwise connected to a Telematics system within the vehicle 23.

Further, depending on the particular implementation, the client device 22 may include a position sensor or GPS module 44 (or have an input to receive data from a position sensor) to determine a current position, a modem 46 to assist in transmission of data over an analog wireless network, vehicle sensors 48 (or have an input to receive data from sensors) to detect conditions of the vehicle, a user input means (such as a microphone 50, an emergency call (E-Call) button 52, and/or an information call (I-Call) button 54), and a user output means (such as a speaker 56). The client device 22 may further be connected to various subsystems of the vehicle for remote control from the service center 24. For instance, one of the Telematics applications may permit remote unlocking of doors.

In one embodiment, the wireless communication device 42 includes a transmitter to transmit voice and data messages via an over the air protocol such as AMPS, CDMA, GSM or TDMA. The wireless communication device 42 may also be configured to transmit by other wireless communications such as satellite communications. As explained above, the transmitter is configured to transmit at least data messages to the service center 24 over a plurality of bearer services. Thus, if the wireless communication device 42 is configured to send messages over an analog protocol, it will need a data modem 46.

The wireless communication device 42 also includes a receiver to receive and decode data messages (including acknowledgements) from the service center 24. The wireless communication device 42 should also include a receiver to receive voice calls from the service center 24. The receiver may be configured to receive data and voice calls through an over the air protocol such as CDMA, GSM, TDMA, or AMPS. The receiver may also be configured to receive other types of wireless communications such as those transmitted by satellites.

The position sensor or GPS module 44 helps the client device 22 to determine and report the location of the vehicle 23. Determining the location of the vehicle 23 may be important in several Telematics applications. For example, when an emergency exists, a message to the service center 24 should contain location data of the vehicle 23 in addition to other data about the emergency. Additionally, when a user requests navigation services, the message may contain data on the current location of the vehicle 23 to assist in generating a navigation route to a desired location.

The vehicle sensors 48 help the client device 22 to monitor conditions of the vehicle for several Telematics applications. For example, a Telematics application for emergency calls may monitor sensors in the vehicle 23 such as airbag deployment. In response to an airbag deployment, the client device 22 may generate and attempt to transmit a data message that includes notification that a collision has occurred. Additionally, when a user requests remote vehicle diagnostics, a Telematics application may gather certain data from vehicle sensors to transmit to the service center 24.

The user input means may include a variety of options such as a microphone 50, an emergency call (E-Call) button 52, and an information call (I-Call) button 54. Other user input means may be included depending on the implementation such as a keyboard to enter words and phrases, a touch graphic screen, and/or additional Telematics application specific buttons. The microphone 50 may be used during voice calls between the client device 22 and the service center 24. The user of the client device 22 in connection with a voice recognition system may further use the microphone 50 for voice commands. Telematics application specific buttons (such as the E-Call button 52 and the I-Call button 54) may be used to wake an application or otherwise initiate the generation and transmittal of specific data messages to the service center 24.

The user output means may include a variety of options such as a speaker 56. Other user output means may be included depending on the implementation such as graphic screens, text screens, and warning indicators. The output means may provide the user with the ability to receive information from the service center 24 relating to a service request.

Figure 3:
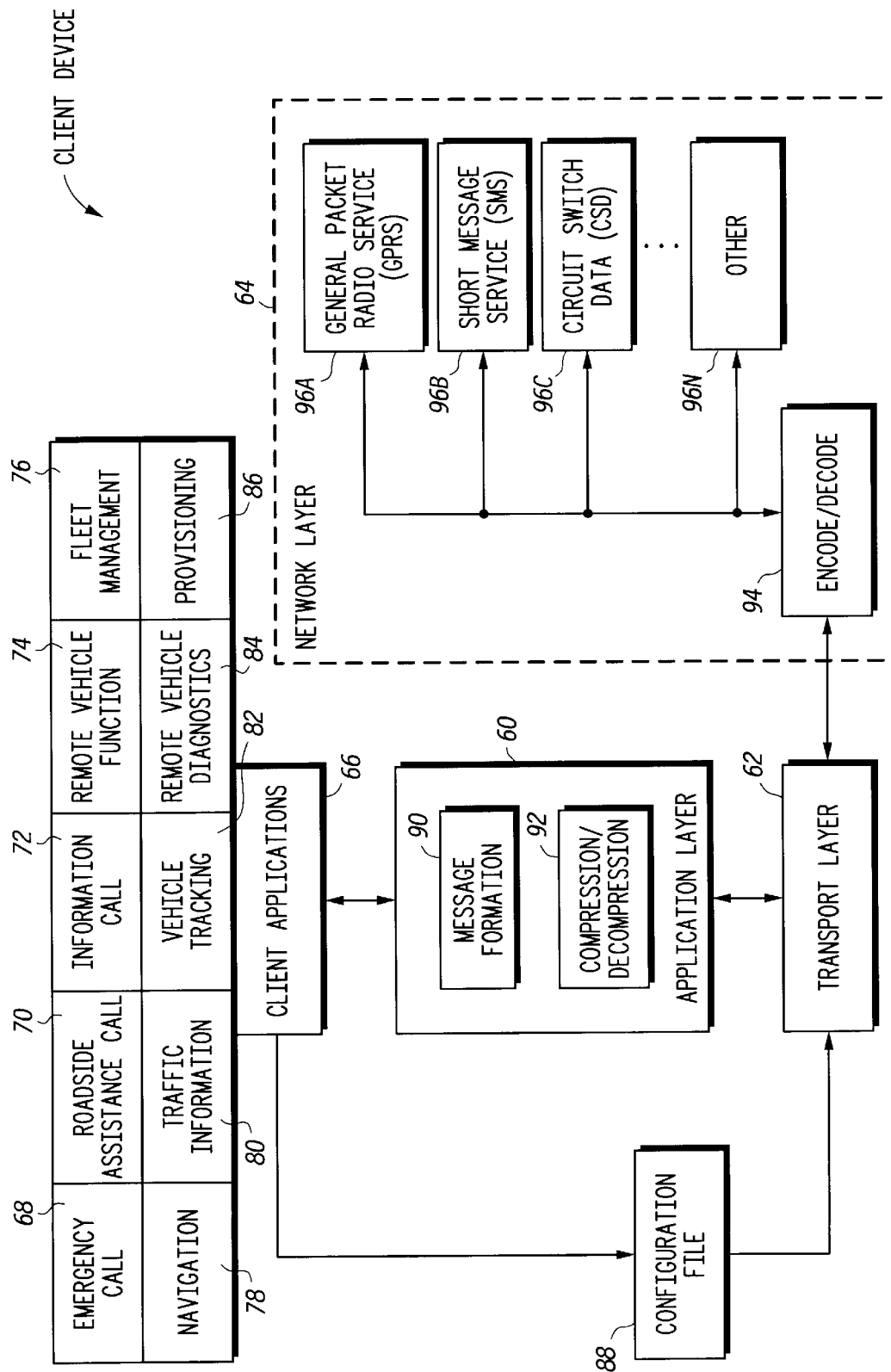
FIG. 3 is a block diagram of various software layers that may exist in a client device for the system in FIG. 1.

FIG. 3 depicts software layers of the client device 22 according to one embodiment of the present invention. As shown in FIG. 3, the major software layers of the client device 22 may include an application layer 60, a transport layer 62, and a network layer 64.

These software layers may be computer modules comprising computer instructions that are stored in a computer-readable medium in the microcomputer 40. These software layers are merely representative of one embodiment of the present invention. In other embodiments, additional layers could be provided as needed, and/or unneeded layers could be deleted or combined.

The software platform in this embodiment includes layers, each of which is briefly summarized below according to its reference numeral in FIG. 3. In one embodiment, the application layer 60 has access to a wide variety of client applications 66 specific for the client device 22. For example, the client applications 66 may include Telematics applications such as emergency call 68, roadside assistance call. 70, information call 72, remote vehicle function 74, fleet management 76, navigation 78, traffic information 80, vehicle tracking 82, remote vehicle diagnostics 84, and provisioning 86. The Telematics applications should be independent from other software applications and modules to allow easy updating for personal customization. As used herein, an "application" is defined as any computer program that provides one or more functions that are of interest to a user of the client device 22.

For example, the emergency call application 68 may be used for notifying the service center 24 of emergencies. For example, in one embodiment, the emergency call application 68 monitors the sensors on the vehicle to determine whether the vehicle 23 has been involved in a collision. This may be done by monitoring an airbag deployment sensor or a sensor on one of the bumpers of the vehicle 23. The emergency call application 68 may additionally monitor the E-Call button 52 or other input means that is based on user demand. When an emergency exists, a data message may be generated and provided to the transport layer 62. The data message may include a priority identification (that the message is high-priority), the type of emergency (such as airbag deployment), the identification of the vehicle (such as the vehicle's identification number (VIN)), and the location of the vehicle 23 (gained from a position sensor 44). In one embodiment, the intent of the data message would be to notify the service center 24 of an emergency so that the service center 24 may contact an emergency service 34 (such as the police, fire brigade, or medical support). The intent of the data message may further be for the client device 22 and the service center 24 to establish a voice communication link to check the status of the occupants of the vehicle 23.

The roadside assistance call application 70 may be used when a vehicle 23 is inoperable and there is a need for vehicle service. For example, in one embodiment, the roadside assistance call application 70 monitors the vehicle sensors 48 or an input means to determine whether the user of the client device 22 is in need of roadside assistance. When roadside assistance is needed, a data message may be generated and provided to the transport layer 62. The data message may include a priority identification (that the message is high-priority), the type of assistance needed (such as a flat tire), the identification of the vehicle (such as the vehicle's VIN), and the location of the vehicle 23 (gained from a position sensor such 44). In one embodiment, the intent of the data message would be to notify the service center that roadside assistance is needed so that the service center 24 may contact a vehicle service 36 (such as a tow truck or automobile mechanic). The intent of the data message may further be for the client device 22 and the service center 24 to establish a voice communication link to discuss the problem further with the operator of the vehicle 23.

The information call application 72 may relate to assistance that does not require physical on-site assistance such as a user requesting to receive information that can be conveyed in a voice call. This may include tourist information or other concierge services. For example, in one embodiment, the information call application 72 monitors an input means such as the I-Call button 54 or microphone 50 that is based on user demand. When the user requests certain information, a data message may be generated and provided to the transport layer 62. The data message may include a priority identification (that the message is not high-priority), the type of call (such as requesting information on the closest restaurant or gas station), the identification of the vehicle (such as the vehicle's VIN), and the location of the vehicle 23 (gained from a position sensor 44). In one embodiment, the intent of the data message would be to notify the service center 24 that the user of the client device 22 is in need of information. In response, the service center 24 may gain the information from contacting a provider of information service 38. The intent of the data message may further be for the client device 22 and the service center 24 to establish a voice communication link to inquire further details from the user or provide the user with the requested information.

The remote vehicle function application 74 may relate to the need to control certain functions or subsystems of the vehicle. For example, the user of the client device 22 may need to remotely unlock the vehicle door locks. For example, in one embodiment, the remote vehicle function application 74 monitors an input means such as an application specific button or microphone 50 that is based on user demand. If the microcomputer 40 and wireless communication device 42 are contained in a portable component, this may also be done outside the vehicle 23. When the user requests a remote vehicle function, a data message may be generated and provided to the transport layer 62. The data message may include a priority identification (that the message is high-priority or not high-priority), the type of call (such as requesting the doors of the vehicle to be unlocked), the identification of the vehicle (such as the vehicle's VIN), and the location of the vehicle 23 (gained from a position sensor 44). In one embodiment, the intent of the data message would be to notify the service center 24 that the user of the client device 22 is in need of assistance.

The fleet management application 76 may relate to a service where there are multiple client devices 22, each in different vehicles. This would enable an owner or other entity to track the location of individual vehicles or certain conditions for each vehicle. For example, in one embodiment, the fleet management application 76 may be a continuously running application that periodically generates and provides data messages to the transport layer 62. The data message may include a priority identification (that the message is not high-priority), the type of call (such as fleet management), the identification of the vehicle (such as the vehicle's VIN), and the location of the vehicle 23 (gained from a position sensor 44). The data message may further include data on the conditions of the vehicle such as fuel, engine, coolant, and oil obtained from sensor(s) on the vehicle. In one embodiment, the intent of the data message would be to periodically notify the service center 24 of the vehicle's location for fleet management.

The navigation application 78 may be used to provide the capability to navigate the vehicle along a determined route. This could include providing instructions to on-board navigation equipment or the capability of providing navigation information or instructions generated by the service center 24. For example, the navigation application 78 may monitor an input means such as an application specific button or microphone 50 that is based on user demand. When the user requests navigation information, a data message may be generated and provided to the transport layer 62. The data message may include a priority identification (that the message is not high-priority), the type of call (such as requesting the navigation information), the identification of the vehicle (such as the vehicle's VIN), and the location of the vehicle 23 (gained from a position sensor 44). In one embodiment, the intent of the data message would be to notify the service center 24 that the user of the client device 22 is in need of navigation information. The service center 24 may then use the vehicle:'s current location and desired destination location to select a route. The selected route may further include consideration of real-time traffic information obtained from a provider of information service 38. Alternatively, the service center 24 may send the real-time traffic information directly to the client device 22 if the client device 22 has on-board navigation hardware and software.

The traffic information application 80 may be used to provide the user of the client device 22 with the status of current road conditions. For example, the traffic information application 80 may monitor an input means such as an application specific button or microphone 50 that is based on user demand. When the user requests navigation information, a data message may be generated and provided to the transport layer 62. The data message may include a priority identification (that the message is not high-priority), the type of call (such as requesting traffic information), the identification of the vehicle (such as the vehicle's VIN), and the location of the vehicle 23 (gained from a position sensor 44). In one embodiment, the intent of the data message would be to notify the service center 24 that the user of the client device 22 is in need of traffic information. The service center 24 may then use the vehicle's current location and desired destination location to warn the user of the client device 22 of undesirable traffic conditions.

The vehicle tracking application 82 may be used to provide the ability of tracking a vehicle after the vehicle has been taken due to theft. For example, similar to the fleet management application, in one embodiment, the vehicle tracking application 82 may generate and provide a data message to the transport layer 62 that includes at least the location of the vehicle 23.

The remote vehicle diagnostics application 84 may be used when a user of the client device 22 is experiencing a problem with a vehicle 23. A user of a vehicle 23 may hear an unpleasant sound or feel a strange vibration while operating the vehicle 23. Most users of vehicles are not trained to know or recognize the source of such a problem. In one embodiment, the remote vehicle diagnostics application 84 monitors an application specific button or microphone 50 that is based on user demand. Alternatively, the remote vehicle diagnostics application 84 may monitor certain critical sensors in the vehicle 23. When a problem appears, a data message may be generated and provided to the transport layer 62. The data message may include a priority identification (that the message is either high-priority or low priority), data on selected vehicle sensors, the identification of the vehicle (such as the vehicle's VIN), and the location of the vehicle 23 (gained from a position sensor 44). In one embodiment, the intent of the data message would be to allow the service center 24 to analyze the problem and report to the user of the vehicle of the apparent problem with the vehicle 23.

The provisioning application 86 may be a more general application that allows the client device 22 to establish and manage configurations for applications required for activation. An example may include updating the phone numbers for contacting the service center 24. Another example may include configuring or altering the different sequential orders of bearer services for high-priority and non-high-priority messages. Accordingly, the provisioning application 86 may communicate with a configuration file 88. The configuration file 88 includes, among other things, information on the bearer services. For example, the configuration file 88 could store bearer service specific information such the different sequential orders of bearer services for high-priority and non-high-priority messages, the timing information for each bearer service, the packet sizes for each bearer service, the number of retries that the client device 22 should attempt to transmit a message for each bearer service, and the destination address or number for each bearer service.

In sum, the application layer 60 takes information from the client applications 66 (such as Telematics applications) and formats a message for the transport layer 62. The application layer 60 also passes messages from lower layers, such as the transport layer 62, and presents the information in the message to the client applications 66. The application layer 60 may be implemented in a number of ways. In one embodiment, the application layer 60 uses extensible Markup Language (XML) for structuring the data for messages. XML allows for easier generation of data and ensures that the data structure is unambiguous. In this case, the application layer 60 uses a message formation function 90 and compression function 92 to generate messages for presentation to the transport layer 62. The message formation function 90 may include XML character encoding. The use of XML, however, will typically lead to larger data messages than comparable binary formats. Accordingly, if XML is used, it is beneficial to use a compression function 92 to compress the XML data efficiently. In one embodiment, the compression function 92 may include XML number encoding to reduce the size of the message. This function 92 may also be used to decompress data for the client applications 66. Several types of XML compression software and compression schemes are publicly available.

The transport layer 62 may provide a variety of tasks such as selecting the type of bearer service (based in part on the type of data in the message), formatting the data message according to the selected bearer service, and monitoring the transmittal of the data message to ensure delivery to the service center 24. In one embodiment, the transport layer 62, receives the data message from the application layer 60 and then accesses certain parameters from the configuration file 88. The transport layer 62 may identify the type of data (such as whether the data is identified as high-priority) and select a bearer service based on the information or other parameters from the configuration file 88. As mentioned above, the configuration file 88 stores different sequential orders of bearer services for high-priority and non-high-priority messages. For example, the sequential order of bearer services for high-priority data may be a list or ranking of bearer services in an order from the highest transmission rate to the lowest transmission rate. For data that is not high-priority, the sequential order of bearer services may be a list or ranking of bearer services in an order from cheaper transmission costs to more expensive transmission costs.

Figure 4:
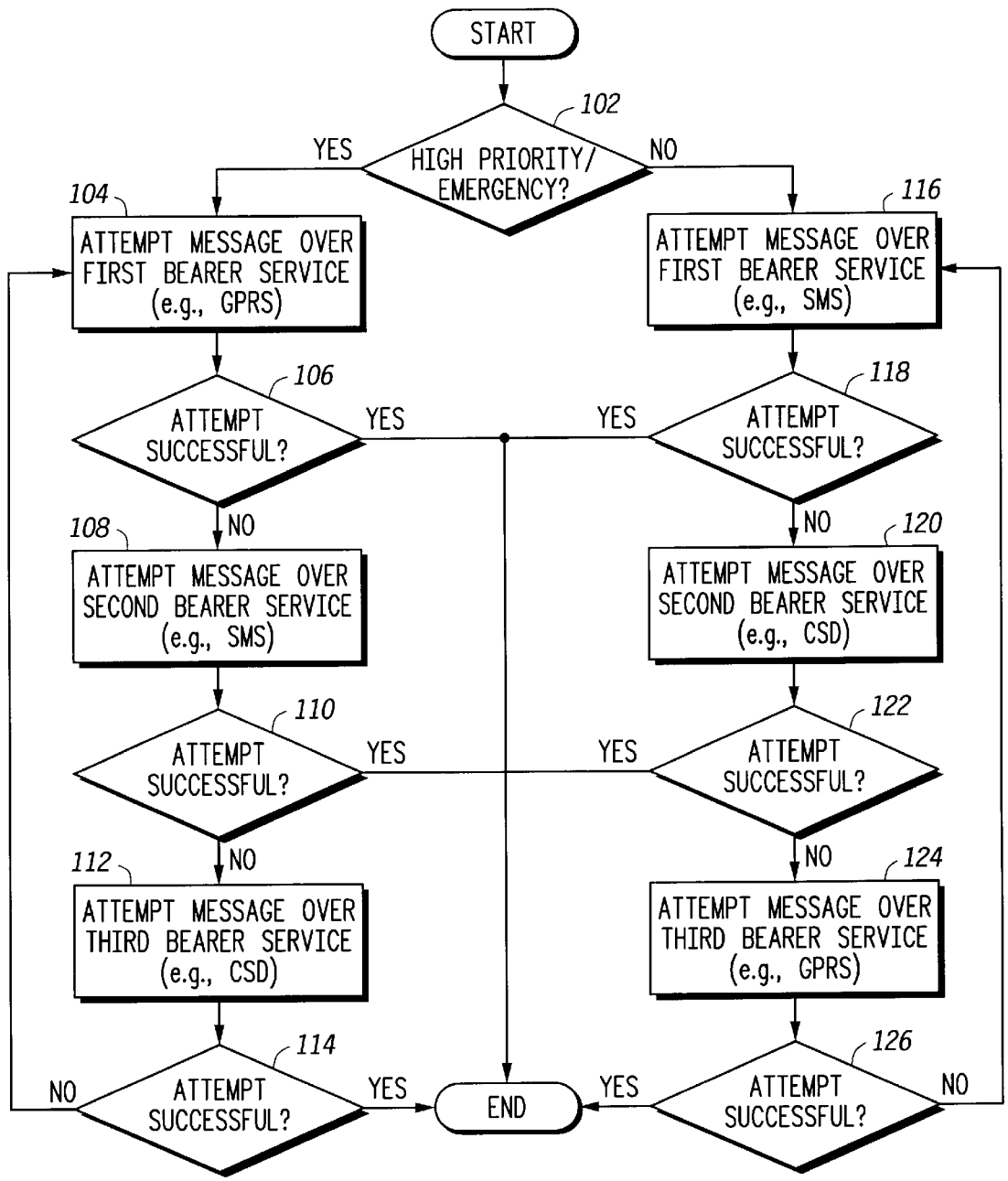
FIG. 4 is a flow diagram illustrating one embodiment of a method in the client device for the present invention.

FIG. 4.shows a flow diagram illustrating one embodiment of a method 100 that may be performed by the client device 22 in assisting in the transmittal of a data message from the client device 22 to the service center 24. In one embodiment of the method 100, there is a decision block 102 that determines whether the data message is high-priority. In making the determination whether the data message is high-priority, the decision may include a consideration of the application that generated the message such as an emergency call or check data within the message to see if the message has been identified as high-priority data.

If the data message is high-priority, then the method 100 will proceed to sequentially select to transmit the data message over a plurality of bearer services 96A–96N. This may be done over process blocks 104, 108, 112. The sequence of selecting each bearer service may be according to a first sequential order of bearer services obtained from the configuration file 88. As mentioned above, for example, the first sequential order of bearer services for high-priority data may be a list of bearer services in an order from the highest transmission rate to the lowest transmission rate. In one embodiment, where the client device 22 is capable of transmitting data messages over bearer services GPRS, SMS, and CSD, the sequential order may be as follows: the first bearer service may be GPRS, the second bearer service may be SMS, and the third bearer service may be CSD.

At process block 104, the method 100 attempts to transmit the data message over the first bearer service. This process may include a single attempt to transmit the message or several attempts for a predetermined number of times. The method 100 then proceeds to decision block 106 where the method 100 determines whether the attempt to transmit the data message over the first bearer service was successful. This can be done by a number of ways. In one embodiment, the service center 24 sends an acknowledgement message after receiving the data message from the client device 22. In this case, the decision block 106 would include a monitoring function that would determine whether an acknowledgement message was received from the service center 24. If the data message was successfully transmitted to the service center 24, then the method 100 ends. Otherwise, the method 100 proceeds to process block 108.

At process block 108, the method 100 attempts to transmit the data message over the second bearer service. This process may include a single attempt to transmit the message or several attempts for a predetermined number of times. The method 100 then proceeds to decision block 110 where the method 100 determines whether the attempt to transmit the data message over the second bearer service was successful. In one embodiment, this is done by determining whether an acknowledgement message was received from the service center 24. If the data message was successfully transmitted to the service center 24, then the method 100 ends. Otherwise, the method 100 proceeds to process block 112.

At process block 112, the method 100 attempts to transmit the data message over the third bearer service. This process may include a single attempt to transmit the message or several attempts for a predetermined number of times. The method 100 then proceeds to decision block 114 where the method 100 determines whether the attempt to transmit the data message over the third bearer service was successful. In one embodiment, this is done by determining whether an acknowledgement message was received from the service center 24. If the data message was successfully transmitted to the service center 24, then the method 100 ends. Otherwise, the;method 100 may proceed back to process block 104 to continue again with the first bearer service. Alternatively, the process may proceed and attempt to transmit the data message over another type of bearer service.

Referring back to decision block 102, if there is a determination that the data in the message is not high-priority, then the method 100 proceeds to process block 116. An example of data in a message that is not high-priority may include those messages generated by an information call application. However, the exact designations are implementation specific. At process block 116, the method 100 attempts to transmit the data message over a first bearer service. Here, the first bearer service is selected from a second sequential order of bearer services that relates to non-high-priority data. For example, as mentioned above, data that is not high-priority may have a different sequential order of bearer services that ranks the bearer services from cheaper transmission costs to more expensive transmission costs.

The process in block 116 may include a single attempt to transmit the message or several attempts for a predetermined number of times. The method 100 then proceeds to decision block 118 where the method 100 determines whether the attempt to transmit the data message over the first bearer service was successful. This can be done by a number of ways. In one embodiment, the service center 24 sends an acknowledgement message after receiving the data message from the client device 22. In this case, the decision block 118 would include a monitoring function that would determine whether an acknowledgement message was received from the service center 24. If the data message was successfully transmitted to the service center 24, then the method 100 ends. Otherwise, the method 100 proceeds to process block 120.

At process block 120, the method 100 attempts to transmit the data message over a second bearer service. This process may include a single attempt to transmit the message or several attempts for a predetermined number of times. The method 100 then proceeds to decision block 122 where the method 100 determines whether the attempt to transmit the data message over the second bearer service was successful. In one embodiment, this is done by determining whether an acknowledgement message was received from the service center 24. If the data message was successfully transmitted to the service center 24, then the method 100 ends. Otherwise, the method 100 proceeds to process block 124.

At process block 124, the method 100 attempts to transmit the data message over a third bearer service. This process may include a single attempt to transmit the message or several attempts for a predetermined number of times. The method 100 then proceeds to decision block 126 where the method 100 determines whether the attempt to transmit the data message over the third bearer service was successful. In one embodiment, this is done by determining whether an acknowledgement message. was received from the service center 24. If the data message was successfully transmitted to the service center 24, then the method 100 ends. Otherwise, the method 100 may proceed back to process block 116 to continue again with the first bearer service. Alternatively, the process may proceed and attempt to transmit the data message over another type of bearer service.

Referring back to FIG. 3, the network layer 64 manages and drives the communication devices to ensure that the data message is sent according to the correct bearer service selected by the transport layer 62. For example, the network layer 64 may include an encode and decode function 94 for the data messages. Additionally, the network layer 64 may include any other software required to drive the communication device to perform the transmittal of the data message over one of a plurality of bearer services 96A–96N. These bearer services may include, among others, GPRS 96A, SMS 96B, and CSD 96C.

Figure 5:
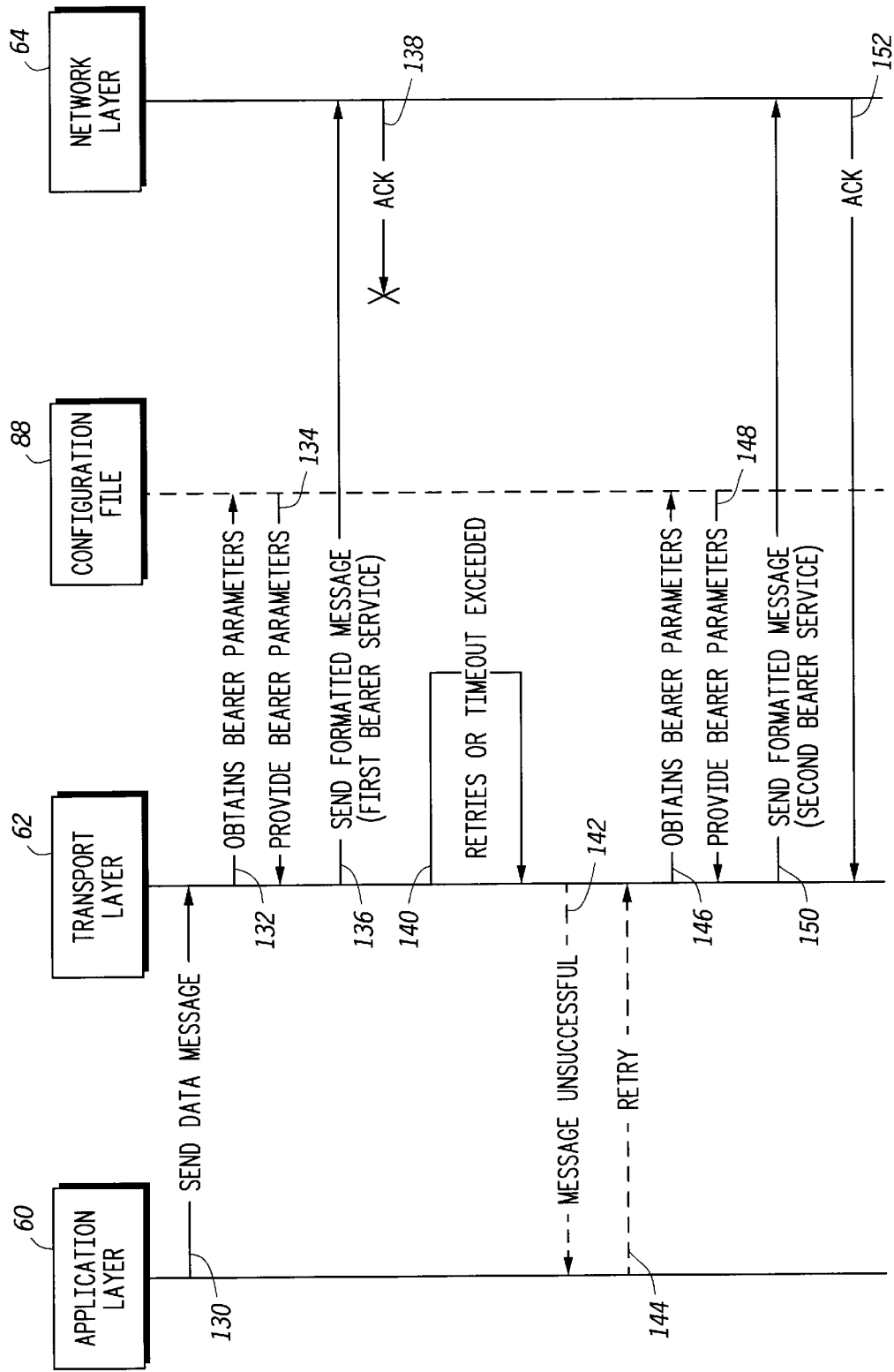
FIG. 5 is a message flow diagram illustrating one embodiment of a method in the client device for the present invention.

FIG. 5 illustrates a flow diagram that further explains the method 100 in FIG. 4. In FIG. 5, in one embodiment of the present invention, there is an application layer 60, a transport layer 62, a network layer 64, and a configuration file 88. Again, these software layers are merely representative of one embodiment of the present invention. In other embodiments, additional layers could be provided as needed, and/or unneeded layers could be deleted or combined.

As explained in more detail above, the application layer 60 generates and sends (130) a data message to the transport layer 62. The application layer 60 has various client applications that generate data messages. These data messages may contain data that is designated as high-priority.

The transport layer 62 then obtains (132) parameters from the configuration file 88. The parameters are associated with the various bearer services that the client device 22 may be capable of supporting. The parameters may define the sequential order or a priority list that the client device 22 uses to select and attempt to transmit the data message to the service center 24. The sequential order or priority list may depend on the type of data contained within the data message (for example, whether the data is designated high-priority or that the data relates to an emergency call). Additionally, the parameters may define certain information needed to format the data message for a particular bearer service such as timers, packet sizes, number of retries, and the destination address or number.

The configuration file 88 will then provide (134) the bearer parameters to the transport layer 62. Once the transport layer 62 has the bearer parameters, it can then send (136) a formatted data message to the network layer 64 according to a first bearer service defined by the configuration file 88. The network layer 64 then encodes the message and drives the communication devices in the client device 22 to transmit the formatted data message to the service center 24.

In one embodiment, the transport layer 62 will then wait for an acknowledge message from the service center 24 to determine whether the message was successfully transmitted. The transport layer 62 may retry (140) to send the message a fixed number of times or wait until a timeout is exceeded. In FIG. 5, for purposes of illustration, it is shown that the acknowledgement (138) was not received by the transport layer 62. At that time, the transport layer 62 may send (142) a message to the application layer 60 to inform that the message was unsuccessful. The application layer 60 may retry (144) to resend the message over another bearer service. Alternatively, the transport layer 62 may skip sending a message to the application layer 60 and simply retry the message over the next bearer service defined in a sequential order from the configuration file 88.

In any event, if the formatted data message is unsuccessful, then the transport layer 62 will then obtain (146) new bearer parameters for a second bearer service from the configuration file 88. The second bearer service should be selected from a sequential order or priority list that depends on the type of data being sent in the message. The configuration file 88 provides (148) the parameters to the transport layer 62. Once the transport layer 62 has the new bearer parameters, it can then send (150) a formatted data message to the network layer 64 according to the second bearer service defined by the configuration file 88. The network layer 64 then encodes the message and drives the communication devices in the client device 22 to transmit the formatted data message to the service center 24.

The transport layer 62 may then wait for an acknowledge message from the service center 24 to determine whether the message was successfully transmitted. In FIG. 5, for purposes of illustration, it is shown that an acknowledgement (152) was received by the transport layer 62. At that time, the process of attempting to transmit the data message may end. If the acknowledgement was not received, then the transport layer 62 may proceed to format and resend the message over a third bearer service.

Service Center 24

The service center 24 of the communication system 20 will now be described in more detail although much of the functionality has already been described above. The exact functionality of the service center 24 will be implementation specific and will depend on what types of services that the service center 24 is configured to provide to a client device 22. In any event, at the heart of the service center 24 should be a server 170 having a microcomputer (see FIG. 1). Depending on the specific implementation of the system, additional components that may be included in the service center 24 comprise a telephone, a computer terminal, a map generation routing engine, a map data store, a traffic database, a web server, a customer database, and a gateway communication unit.

Figure 6:
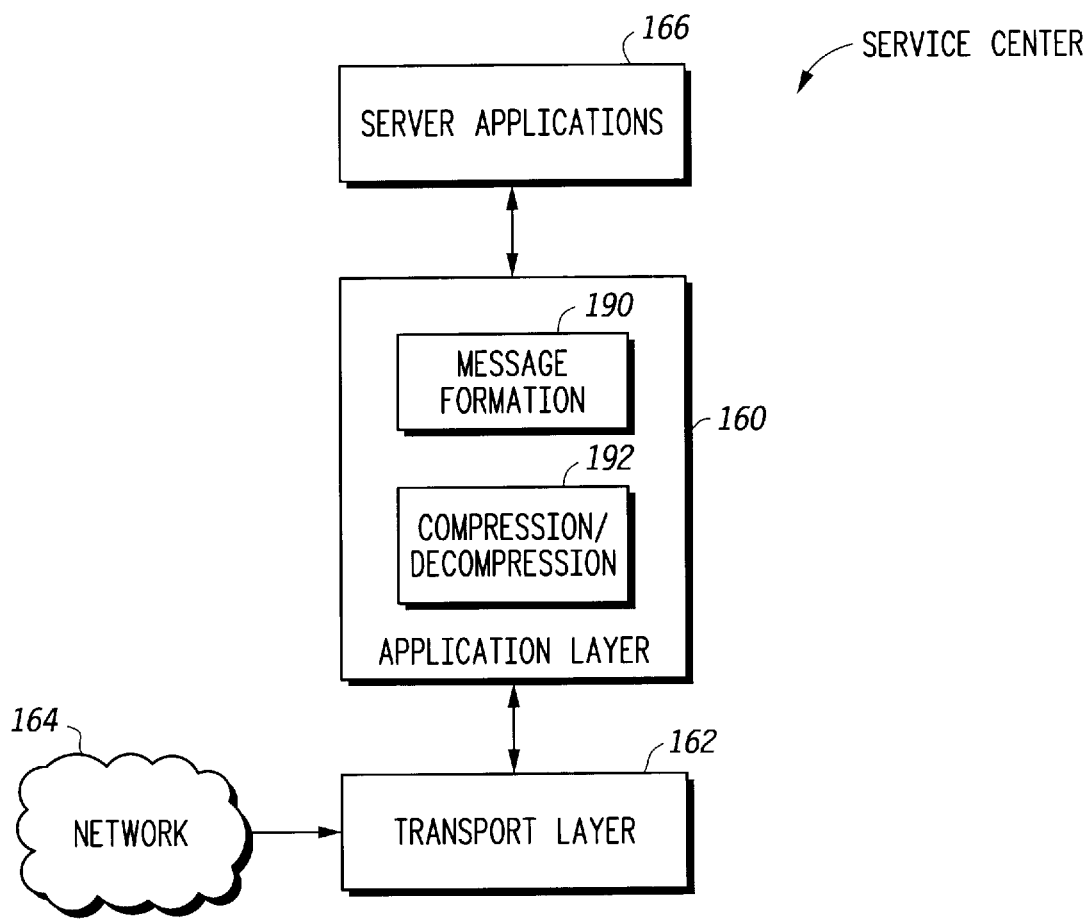
FIG. 6 is a block diagram of various software layers that may exist in a service center for the system in FIG. 1.

The service center 24, through the server, may perform several functions including receiving data messages from the client device 22, transmitting acknowledgments and other messages to the client device 22, and contacting services 34, 36, 38 (see FIG. 1). FIG. 6 depicts software layers of the service center 24 according to one embodiment of the present invention. As shown in FIG. 6, the major software layers of the service center 24 may include an application layer 160 and a transport layer 162.

These software layers may be computer modules comprising computer instructions that are stored in a computer-readable medium in the server 170 of the service center 24. These software layers are merely representative of one embodiment of the present invention. In other embodiments, additional layers could be provided as needed, and/or unneeded layer could be deleted or combined. For example, the service center 24 may also include a network layer to perform functions similar to that described in relation to the client device 22 if a wireless network 164 does not provide those functions.

The software platform in this embodiment includes the layers, each of which is briefly summarized below according to its reference number in FIG. 6. In one embodiment, the transport layer 162 receives data messages from a wireless network 164 and presents new data messages to the wireless network 164. The data messages received from the wireless network 164 will originate the client device 22 over communications A, C, or E through one of a plurality of bearer services (as shown in FIG. 1).

The transport layer 162 may provide a variety of tasks such as monitoring the transmittal of data messages from client devices 22, presenting received data messages to the application layer 160, and formatting new data messages (such as acknowledgement messages) intended for the client device 22. In one embodiment, the application layer 160 uses XML for reading and structuring the data messages. In such a case, the transport layer 162 and application layer 160 may use a compression/decompression function 192 and a message formation function 190 to accept and generate data messages. The compression/decompression function 192 would decompress the data messages received from the client device 22 and compress data messages that are generated by the application layer 160 for transmittal to the client device 22. Several types of XML compression software and compression schemes are publicly available. The message formation function 90 may include XML encoding for data messages that are for transmittal to the client device 22. One example of data messages for transmittal to the client device 22 include acknowledgement messages.

The application layer 160 controls the operation and status of the service center 24, activates server applications 166 (such as Telematics applications), manages required resources for applications, and monitors errors during operation. The types of server applications 166 will depend on the type of client applications that exist for the client device 22. It is desirable that a similar type of server application exists for each type of client application 66 described above. This would allow the server to handle the different types of requested services by the client device 22.

For example, one server application 166 may reside in the service center 24 that corresponds to the emergency call application 68 described above. The corresponding server application 166 would be capable of handling a data message that includes emergency call data. In one embodiment, the data message could be forwarded to an emergency service 34 to report the location of the vehicle 23. Alternatively, the contents of the data message may appear on a data terminal of an operator at the service center 24 that would allow the operator to call the emergency service 34 and report the location of the vehicle 23. The operator at the service center 24 may also establish a voice communication with the client device 22 to inquire about the status of the occupants of the vehicle 23.

Further, another server application 166 may correspond to the roadside assistance call application 70 described above. The corresponding server application 166 would be capable of handling a data message that includes roadside assistance call data. In one embodiment, the data message could be forwarded to a vehicle service 36 to report the location of the vehicle 23. Alternatively, the contents of the data message may appear on a data terminal of an operator at the service center 24 that would allow the operator to call the vehicle service 36 and report the location of the vehicle 23. The operator at the service center 24 may also choose to establish a voice communication with the client device 22 to inquire about the status of the vehicle 23 and/or obtain further details about the type of assistance in needed.

Another server application 166 may correspond to other types of client applications in the vehicle that request or provide information. The corresponding server applications would be capable of handing the data messages requesting or providing information. Depending on the type of information requested or provided, the message may be automatically forwarded to an information service 38. Alternatively, the contents of the data message may appear on a data terminal of an operator at the service center 24 that would allow the operator to call the information service 38 and obtain or provide the requested information. The operator at the service center 24 may also choose to establish a voice communication with the client device 22 to provide the requested information or transmit a data message to the client device 22 that includes the requested information.

What has been described is a device and method for transmitting a message from a client device to a service center. The device and method provides several benefits including: more reliability of transmitting data messages; utilization of data messages so that both voice and data transmissions may occur simultaneously; reducing latency by using a plurality of bearer services; more flexibility in allowing the ability to configure the sequential orders of bearer services for different types of data; lower costs by setting up the sequential order of bearer services for low priority data according to transmission costs; and increasing the time to report emergencies by setting up the sequential order of bearer services for high-priority data according to transmission rates. The above description of the present invention is intended to be exemplary only and is not intended to limit the scope of any patent issuing from this application. The present invention is intended to be limited only by the scope and spirit of the following claims.

What is claimed is:

1. A client device operable to communicate in at least one communication system to a service center, the client device comprising:

a microcomputer in the client device for generating a message and determining whether the message includes high-priority data; and a plurality of bearer services operable on the at least one communication system using associated over-the-air protocols;

wherein the microcomputer sequentially selects to transmit the message over each of the plurality of bearer services according to a first sequential order until the message is transmitted to the service center and a response is received therefrom if the message includes high-priority data;

wherein the microcomputer sequentially selects to transmit the message over each of the plurality of bearer services according to a second sequential order until the message is transmitted to the service center and a response is received therefrom if the message does not include high-priority data.

2. The device in claim 1, wherein the first sequential order of bearer services is based according to a transmission rate of each bearer service.

3. The device in claim 2, wherein the second sequential order of bearer services is based according to a transmission cost of each bearer service.

4. The device in claim 1, wherein the first sequential order of bearer services and the second sequential order of bearer services are configurable.

5. The device in claim 1, wherein the determination by the microcomputer of whether the message includes high-priority data includes determining whether the data relates to an emergency call.

6. The device in claim 1, wherein the plurality of bearer services includes at least general packet radio service, short message service, and circuit switched data service.

7. A method for communicating data in a message from a client device to a service center, the method comprising the steps of:

providing a plurality of bearer services operable on at least one communication system using associated over-the-air protocols; and determining by the client device whether the data in the message is high-priority; wherein if the message includes high-priority data, then sequentially selecting to transmit the message over each of the plurality of bearer services according to a first sequential order of bearer services until the message is transmitted to the service center and a response is received therefrom;

if the message does not include high-priority data, then sequentially selecting to transmit the message over each of the plurality of bearer services according to a second sequential order of bearer services until the message is transmitted to the service center and a response is received therefrom.

8. The method in claim 7, wherein the first sequential order of bearer services is based according to a transmission rate of each bearer service.

9. The method in claim 8, wherein the second sequential order of bearer services is based according to a transmission cost of each bearer service.

10. The method in claim 7, wherein the first sequential order of bearer services and the second sequential order of bearer services are configurable.

11. The method in claim 7, wherein the step of determining whether the data is high-priority includes determining whether the data relates to an emergency call.

12. The method in claim 7, wherein the plurality of bearer services includes at least general packet radio service, short message service, and circuit switched data service.

13. A method for communicating a message from a client device to a service center, the method comprising the steps of:

providing a plurality of bearer services operable on at least one communication system using associated over-the-air protocols; and determining whether the message includes high-priority data; wherein attempting to transmit the message over each of the plurality of bearer services by sequentially selecting each bearer service according to a first sequential order of bearer services if the message includes high-priority data;

attempting to transmit the message over each of the plurality of bearer services by sequentially selecting each bearer service according to a second sequential order of bearer services if the message does not include high-priority data.

14. The method in claim 13, wherein the first sequential order of bearer services is based according to a transmission rate of each bearer service.

15. The method in claim 14, wherein the second sequential order of bearer services is based according to a transmission cost of each bearer service.

16. The method in claim 13, wherein the first sequential order of bearer services and the second sequential order of bearer services are configurable.

17. The method in claim 13, wherein the step of determining whether the message includes high-priority data includes determining whether the message relates to an emergency call.

18. The method in claim 13, wherein the plurality of bearer services includes at least general packet radio service, short message service, and circuit switched data service.

19. A method for communicating a message from a client device to a service center, the method comprising the steps of:

providing a plurality of bearer services operable on at least one communication system using associated over-the-air protocols; and determining whether the message includes high-priority data;

attempting to transmit the message over a first bearer service to the service center, the first bearer service selected from a first priority list if the message includes high-priority data, the first bearer service selected from a second priority list if the message does not include high-priority data;

determining whether the message was successfully transmitted to and received by the service center over the first bearer service;

attempting to transmit the message over a second bearer service to the service center, the second bearer service selected from the first priority list if the message includes high-priority data, the second bearer service selected from a second priority list if the message does not include high-priority data;

determining whether the message was successfully transmitted to and received by the service center over the second bearer service.

20. The method in claim 19, wherein the first sequential order of bearer services is based according to a transmission rate of each bearer service.

21. The method in claim 20, wherein the second sequential order of bearer services is based according to a transmission cost of each bearer service.

22. The method in claim 19, wherein the first sequential order of bearer services and the second sequential order of bearer services are configurable.

23. The method in claim 19, wherein the step of determining whether the message includes high-priority data includes determining whether the message relates to an emergency call.

24. The method in claim 19, wherein the plurality of bearer services includes at least general packet radio service, short message service, and circuit switched data service.

* * * * *